United States Patent
Egbert

[15] 3,659,909
[45] May 2, 1972

[54] BEARING CONSTRUCTIONS

[72] Inventor: James Egbert, Verstand Engineering, Inc. 32371 Dequindre, Madison Heights, Mich. 48071

[22] Filed: Oct. 26, 1970

[21] Appl. No.: 83,781

[52] U.S. Cl. ........................308/6 R, 308/3.8, 64/23.7
[51] Int. Cl. ..........................................F16c 19/00
[58] Field of Search ..................308/3.8, 6; 64/23.7

[56] References Cited

UNITED STATES PATENTS

| 3,433,033 | 3/1969 | Watson | 308/6 R |
| 3,059,979 | 10/1962 | Hohl et al | 308/6 R |
| 3,407,011 | 10/1968 | Zeidler | 308/6 R |
| 3,353,875 | 11/1967 | Karge | 308/6 R |
| 1,841,032 | 1/1932 | Hutchinson | 308/6 R |
| 2,144,156 | 1/1939 | Johnson | 308/6 R |
| 2,638,387 | 5/1953 | Bech | 308/6 R |

FOREIGN PATENTS OR APPLICATIONS

| 636,315 | 2/1962 | Canada | 308/6 |

*Primary Examiner*—Martin P. Schwadron
*Assistant Examiner*—Ronald H. Lazarus
*Attorney*—Cullen, Settle, Sloman & Cantor

[57] ABSTRACT

An anti friction bearing construction comprising a sleeve in which is telescoped a flat sided polygonal cross-section shaft; with longitudinally spaced rollers frictionlessly mounted in the sleeve and engaging the flat sides of the shaft.

1 Claims, 3 Drawing Figures

Patented May 2, 1972

3,659,909

INVENTOR
JAMES EGBERT

BY Cullen, Settle, Sloman & Cantor

ATTORNEYS

BEARING CONSTRUCTIONS

GENERAL DESCRIPTION

Bearings for flat sided polygonal shafts are known. Typical examples are shown in the following six prior art patents found as a result of a preliminary search made in advance of the filing of this application: Range, U.S. Pat. No. 982,870; Johnson, U.S. Pat. No. 2,144,156; Collett, U.S. Pat. No. 2,211,881; Bech, U.S. Pat. No. 2,638,387; Zeidler, U.S. Pat. No. 3,375,045; and Hudson, U.S. Pat. No. 3,469,893.

THE PREFERRED EMBODIMENT

In this application there is disclosed an anti friction bearing for a flat sided shaft, shown as a preferred embodiment as of square cross-section, with the bearing comprising a sleeve, shown round for preference, with the sleeve having in the preferred form shown four transversely extending elongated small diameter round rollers which are longitudinally spaced and which extend across the interior of the sleeve and which engage the flat sides of the shaft across their full widths to provide bearings for the shaft at longitudinally spaced points. The rollers are journalled in needle, roller, or ball bearings in the sleeve.

The presently preferred embodiment of the invention is shown in the appended drawing. In this drawing; wherein the parts are shown simplified for clarity;

DETAILED DESCRIPTION

Figure 1:
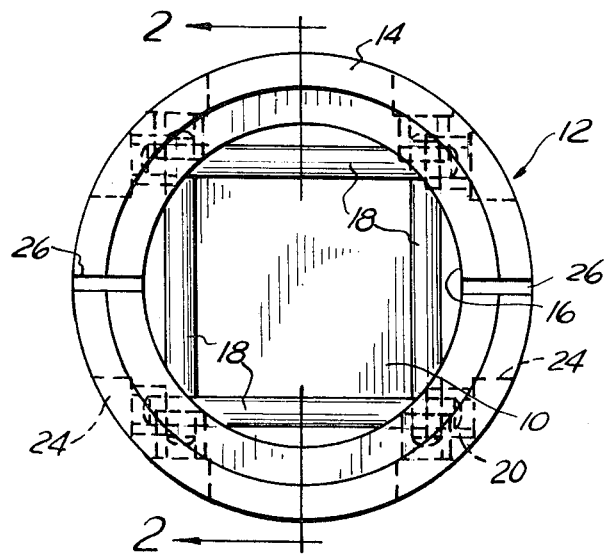
FIG. 1 is an end view.
Figure 2:
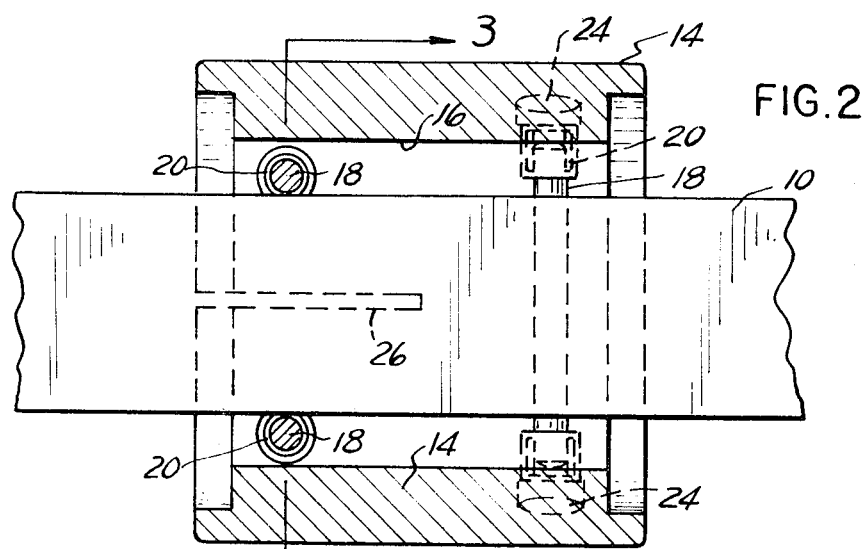
FIG. 2 is a longitudinal sectional view, as if on line 2—2 of FIG. 1.
Figure 3:
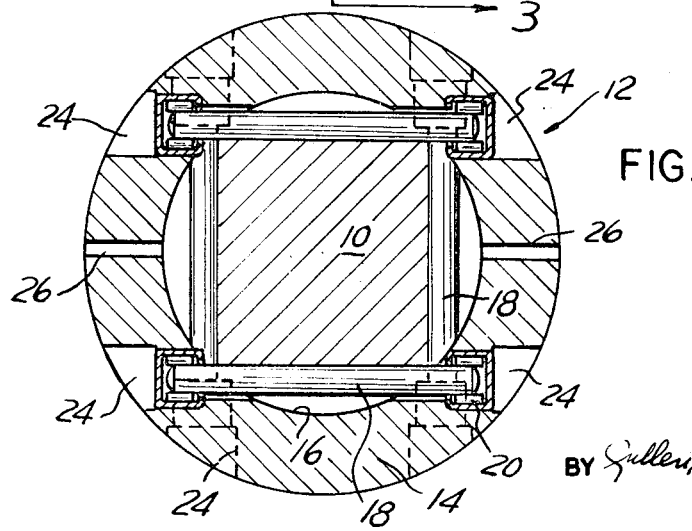
FIG. 3 is a transverse sectional view, as if on line 3—3 of FIG. 2.

The drawing shows an elongated square flat sided shaft 10 and a linear bearing 12 for such shaft. A seal, not shown, may be employed to seal the shaft in the bearing.

Each linear bearing comprises a hollow sleeve 14 having its interior wall 16 of circular cylindrical form. Mounted in the sleeve in longitudinally spaced arrangement are transversely extending elongated small diameter rollers 18, traversing the interior of the sleeve and positioned to be engaged by the flat sides of the shaft to provide bearings for the shaft at longitudinally spaced points along the shaft. There is at least one such roller for each side of the shaft and they are arranged in separate and different transverse planes as shown.

The ends of the rollers 18 are surrounded by and journalled in bearings 20 press fitted in small transverse bores 24 of the sleeve 14.

In the preferred form shown the shaft is of square cross-section and thus there are four rollers arranged to define a square to accommodate the square shaft and arranged in two separate and different longitudinally spaced planes as shown.

In the preferred form shown the sleeve has its exterior wall 14 of circular cylindrical form.

In a preferred form two bearings 12 may be employed for a shaft and they would be longitudinally spaced.

PRELOADING

For preloading the bearing of the sleeve on the shaft, the sleeve is longitudinally split as shown at 26 for at least part of its length and on at least one of its sides to enable it to be pinched in. Such pinching in for preloading can be accomplished by means of an adjusting screw, not shown, mounted in the sleeve and accessible from outside the sleeve; other pinching in or preloading means may be employed.

ADDITIONAL NOTES

While in the preferred form each sleeve is shown as made up of a one-piece ring of considerable length and is used in pairs, with two sleeves per shaft, and with each sleeve having a complete set of four rollers for the square sided shaft, it will be understood that a sleeve may be made of one or more rings which are joined or positioned so as to function together as a sleeve. Thus, wafer-like multiples of one or more rings may be considered as forming a sleeve.

While in the preferred form shown the shaft is square and the sleeve and its bearings are arranged to cooperate with a square type shaft, it will be understood that the shaft could be of any polygonal flat sided form, triangular, rectangular, pentagonal, hexagonal, etc. The square shape shown is the preferred embodiment.

In the preferred embodiment the sleeve is shown as a unitary sleeve to be mounted as a unitary element in a mounting part such as part of a machine tool or the like. However, the sleeve can be made integral with any mounting part, such as a mounting part of a machine tool or the like.

The sleeve is shown as round in the preferred embodiment but its exterior surface may be shown as preferred, with the sleeve being preferably formed for being mounted as a unitary element in a mounting part.

If the sleeve is mounted, it can function as a bearing for a shaft. Otherwise, the shaft can be considered as providing a bearing way or rod for the sleeve.

With a proper relative arrangement of the sleeve and shaft, a rotated shaft can be used to transmit torque to a sleeve, or conversely, a rotated sleeve can be used to transmit torque to a shaft.

It is important to note the degree to which friction is minimized. The rollers 18 between the sleeve 14 and the shaft 10 are frictionlessly journalled in the bearings 20 in the sleeve 14.

It is important to note that the rollers 18 traverse the full width of the engaged faces of the shaft, providing full width engagement, as contrasted from narrow line or narrow stripe contacts that might otherwise be provided.

Since mechanics are fully aware of the advantages of minimizing friction, we do not stress here these advantages; but we do point out how effectively friction is minimized in the construction here shown, all as above described.

It will be understood that bores 24 establish the axes of the rollers 18, and these in turn establish the axis of the shaft 10. For these reasons, it is often preferred to employ two sleeves per shaft.

The fact that the accommodated shaft is square, may be recognized as providing rotational stability to the degree that substantial torque loads can be transmitted between the shaft and the sleeve with the bearing maintaining its frictionless qualities. Thus a single shaft may be used for torque transmitting and with proper guidance of the shaft, as contrasted with known machine tool constructions which two or more parallel shafts for such purposes.

CONCLUSION

Now having described the bearing construction herein disclosed, reference should be had to the claims which follow.

I claim:

1. In combination, an elongated flat and smooth sided square cross-section shaft, and a linear bearing for said shaft; said bearing comprising a hollow round straight sided cylindrical unitary sleeve;

longitudinally spaced, transversely extending, elongated, small diameter, straight sided needles traversing the interior of the sleeve and traversing and engaging the flat smooth sides of the shaft to provide needle bearings for the shaft at longitudinally spaced points;

there being at least four such needles, arranged in at least two separate and different transverse planes; two to a plane; and with the ends of each of the needles being within and surrounded by and journalled in two larger diameter frictionless bearings, these being mounted in sockets of the sleeve;

with the needles being of a length to a diameter ratio of at least about 6 to 1, whereby the ratio of cross sectional area of the shaft to the cross sectional area of the sleeve is at a maximum.

* * * * *